United States Patent
Pence et al.

(10) Patent No.: US 10,347,927 B2
(45) Date of Patent: Jul. 9, 2019

(54) ASSEMBLY FOR THERMAL MANAGEMENT OF A FUEL CELL

(71) Applicant: Ford Global Technologies, LLC, Dearborn, MI (US)

(72) Inventors: Benjamin Pence, Rigby, ID (US); Michael Allen DeBolt, Saline, MI (US); Valerie Anne Nelson, Livonia, MI (US); Daniel E. Wilkosz, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 15/652,331

(22) Filed: Jul. 18, 2017

(65) Prior Publication Data
US 2019/0027766 A1    Jan. 24, 2019

(51) Int. Cl.
| | |
|---|---|
| *H01M 8/04746* | (2016.01) |
| *H01M 8/0263* | (2016.01) |
| *H01M 8/0267* | (2016.01) |
| *H01M 8/04007* | (2016.01) |
| *H01M 8/0438* | (2016.01) |

(52) U.S. Cl.
CPC ..... *H01M 8/04768* (2013.01); *H01M 8/0263* (2013.01); *H01M 8/0267* (2013.01); *H01M 8/04007* (2013.01); *H01M 8/04417* (2013.01); *H01M 2250/20* (2013.01)

(58) Field of Classification Search
CPC .......... H01M 8/04768; H01M 8/0263; H01M 8/04007; H01M 8/0267; H01M 8/04417
See application file for complete search history.

(56) References Cited

U.S. PATENT DOCUMENTS

| | | |
|---|---|---|
| 6,322,915 B1 | 11/2001 | Collins et al. |
| 7,651,799 B2 | 1/2010 | Guenther et al. |
| 7,727,660 B2 | 6/2010 | Frederiksen et al. |
| 8,057,945 B2 | 11/2011 | Wang et al. |
| 2006/0141312 A1* | 6/2006 | Fredley ............... H01M 8/0263 429/435 |
| 2013/0224613 A1* | 8/2013 | Vanderwees ...... H01M 8/04141 429/414 |
| 2016/0233530 A1* | 8/2016 | Mathie ............... H01M 8/04074 |
| 2017/0110755 A1* | 4/2017 | Ikeda .................. H01M 8/2483 |

* cited by examiner

*Primary Examiner* — Stewart A Fraser
(74) *Attorney, Agent, or Firm* — Brooks Kushman P.C.

(57) ABSTRACT

A fuel cell assembly including a plate assembly having an anode inlet, a cathode inlet, a first coolant inlet, and a second coolant inlet is provided. The first coolant inlet is located adjacent the anode inlet on a first plate side. The second coolant inlet is located adjacent the cathode inlet on a second plate side. The inlets are arranged such that coolant influences reactant temperature at the anode and cathode inlets to encourage formation of a membrane uniform hydration distribution during fuel cell operation. The fuel cell assembly may include a hydrogen channel, an oxygen channel, and a coolant channel. The coolant channel may extend between the hydrogen channel and the oxygen channel to draw heat from hydrogen and oxygen flowing therethrough and such that the hydrogen and oxygen are close enough to one another for chemical reaction therebetween.

20 Claims, 5 Drawing Sheets

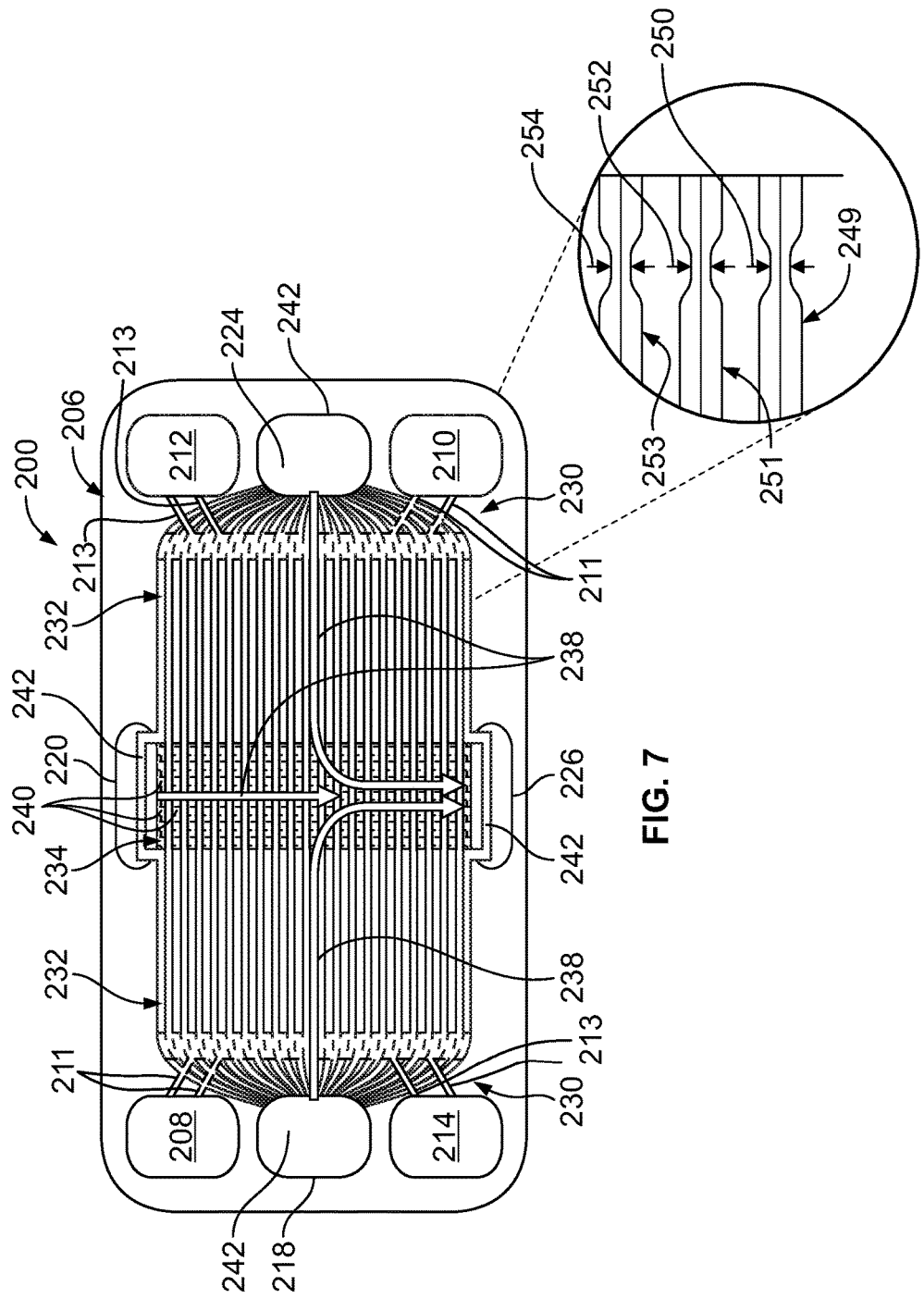

ASSEMBLY FOR THERMAL MANAGEMENT OF A FUEL CELL

TECHNICAL FIELD

This disclosure relates to a system to assist in managing thermal conditions within a fuel cell stack.

BACKGROUND

A vehicle, such as a fuel cell vehicle, may contain an energy storage device, such as a fuel cell stack, to power components of the vehicle. The fuel cell stack may be integrated with systems to assist in managing vehicle performance and fuel cell stack operations. A system or assembly may assist in managing thermal conditions of the fuel cell stack as described herein.

SUMMARY

A fuel cell assembly includes a plate assembly having an anode inlet, a cathode inlet, a first coolant inlet, and a second coolant inlet. The first coolant inlet is located adjacent the anode inlet on a first plate side. The second coolant inlet is located adjacent the cathode inlet on a second plate side. The inlets are arranged such that coolant influences reactant temperature at the anode and cathode inlets to encourage formation of a membrane uniform hydration distribution during fuel cell operation. The fuel cell assembly may include a hydrogen channel, an oxygen channel, and a coolant channel. The hydrogen channel may extend between the anode inlet and an anode outlet disposed on the second plate side. The oxygen channel may extend between the cathode inlet and a cathode outlet disposed on the first plate side. The coolant channel may extend between the first coolant inlet and a coolant outlet. The coolant channel may extend between the hydrogen channel and the oxygen channel to draw heat from hydrogen and oxygen flowing therethrough and such that the hydrogen and oxygen are close enough to one another for chemical reaction therebetween. The fuel cell assembly may include a first coolant outlet disposed on a third plate side, a second coolant outlet disposed on a fourth plate side, and a coolant flow field fluidly connecting the coolant inlets and outlets. The coolant inlets and the coolant outlets may be arranged with one another such that a flow rate of coolant from the coolant inlets to the coolant outlets is uniformly distributed across the coolant flow field. The coolant flow field may include a central region having one or more columns to influence coolant flow turbulence to promote a uniform coolant flow rate from the coolant inlets to the coolant outlets. The plate assembly may include two plates, each plate including a pair of serpentine walls arranged with one another to form two separate coolant channels between the serpentine walls, a hydrogen channel extending substantially perpendicular to a portion of one of the coolant channels and between the anode inlet and an anode outlet, and an oxygen channel extending substantially perpendicular to a portion of one of the coolant channels and between the cathode inlet and a cathode outlet. The channels may be arranged with one another such that the hydrogen channel and the oxygen channel are adjacent one another to promote chemical reactions therebetween and such that coolant flowing through the coolant channel is in thermal communication with hydrogen and oxygen flowing through the hydrogen channel and the oxygen channel. The fuel cell assembly may further include a first pressure regulator, a second pressure regulator, and a third pressure regulator. The first pressure regulator may control a first coolant flow pressure at the first coolant inlet. The second pressure regulator may control a second coolant flow pressure at the second coolant inlet. The third pressure regulator may control a third coolant flow pressure at a first coolant outlet. The pressure regulators may be tuned to promote a constant coolant flow from the coolant inlets to the coolant outlets. The arrangement of the inlets may influence reactant temperature at the anode inlet and the cathode inlet to be between sixty degrees Celsius and seventy degrees Celsius.

A fuel cell plate assembly includes a hydrogen channel, an oxygen channel, and first and second coolant channel configurations. The hydrogen channel extends from an anode inlet to an anode outlet. The oxygen channel extends from a cathode inlet to a cathode outlet. The first and second coolant channel configurations each include a coolant inlet and a coolant outlet. The anode inlet and the cathode outlet are located on a first plate side, the cathode inlet and the anode outlet are located on a second plate side, each of the coolant inlets are located on a third plate side, and each of the coolant outlets are located on a fourth plate side such that coolant within the first and second coolant channel configurations flows in a direction substantially perpendicular to a portion of hydrogen flowing within the hydrogen channel and oxygen flow within the oxygen channel. Each of the coolant inlets may be located adjacent one of the anode inlet and the cathode inlet such that a reactant passing through the anode inlet or the cathode inlet is in thermal communication with coolant entering one of the coolant inlets. The fuel cell plate assembly may include three pressure regulators each positioned at one of the coolant inlets and the coolant outlet. The pressure regulators may be tuned to promote a substantially constant coolant flow between the coolant inlets and the coolant outlet. The first and second coolant channel configurations may each define a serpentine shape between respective coolant inlets and coolant outlets. The fuel cell plate assembly may include a pressure regulator at each of the coolant inlets and the coolant outlets, sensors, and a controller. One of each of the sensors may be located at each of the anode inlet and the cathode inlet to monitor thermal conditions of an entering reactant. The controller may be in communication with the pressure regulators and the sensor and programmed to adjust a coolant pressure based on the monitored thermal conditions of the anode inlet or the cathode inlet. The controller may direct the pressure regulators to operate to maintain a constant coolant flow rate throughout the first and second coolant channel configurations. The arrangement of the inlets may influence reactant temperature at the anode inlet and the cathode inlet to be between sixty degrees Celsius and seventy degrees Celsius.

A fuel cell assembly includes a plate assembly and three pressure regulators. The plate assembly includes a first coolant inlet located between an anode inlet and a cathode outlet, a second coolant inlet located between a cathode inlet and an anode outlet, and a third coolant inlet located on a plate assembly first side opposite a coolant outlet located on a plate assembly second side. The three pressure regulators each control a coolant flow pressure through one of the first coolant inlet, the second coolant inlet, and the third coolant inlet. The pressure regulators are arranged with one another to tune the coolant flow pressure such that the coolant flow pressure at the coolant outlet is less than the coolant flow pressure at the third coolant inlet which is less than the coolant flow pressure at the first and second coolant inlets. The three pressure regulators may be tuned to promote a substantially constant coolant flow at a central region of the plate assembly. The three pressure regulators may be tuned to promote a flow pressure at the first and second coolant inlets of approximately 3.0 atmospheres, and a flow pressure at the third coolant inlet of approximately 1.3 atmospheres. The fuel cell assembly may include a fourth pressure regulator for maintaining a coolant flow pressure through the coolant outlet at a pressure lower than a pressure of the coolant inlets. The fuel cell assembly may include sensors and a controller. A sensor may be located at each coolant inlet and outlet for measuring a pressure of coolant flow. The controller may be in communication with the sensors and the three pressure regulators and programmed to adjust pressure control of the three pressure regulators such that a coolant pressure flow at the coolant outlet is between 1.2 and 3.1 atmospheres. The fuel cell assembly may include hydrogen channels, oxygen channels, and coolant channels. The hydrogen channels may extend between the anode inlet and the anode outlet. The oxygen channels may extend between the cathode inlet and the cathode outlet. The coolant channels may extend between the coolant inlets and the coolant outlet. The channels may be arranged with one another such that the hydrogen channels and the oxygen channels are disposed between the coolant channels for thermal communication between reactants and coolant flowing through respective channels.

BRIEF DESCRIPTION OF THE DRAWINGS

FIG. 7 is a schematic diagram from a plan view depicting an example of a portion of a fuel cell assembly.

FIG. 8 is a detailed view of a portion of a plate assembly of the fuel cell assembly of FIG. 7.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
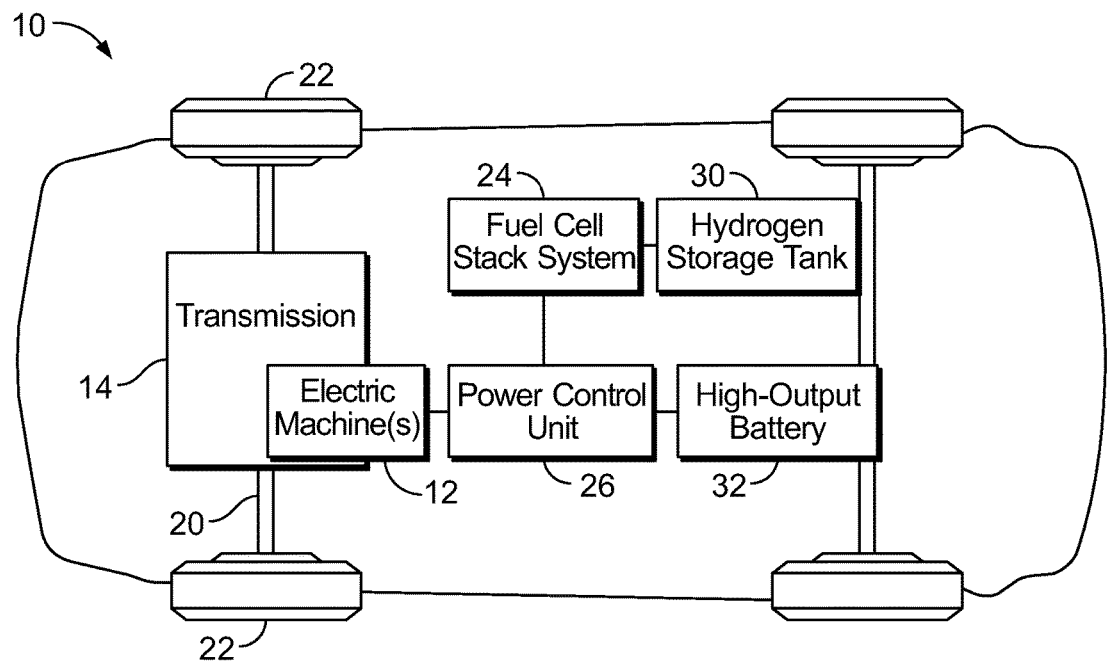
FIG. 1 is a schematic diagram depicting an example of a fuel cell vehicle.

FIG. 1 depicts a schematic diagram of an example of a fuel cell vehicle, referred to generally as a vehicle 10 herein. The vehicle 10 may include one or more electric machines 12 mechanically connected to a transmission 14. Each of the electric machines 12 may be capable of operating as a motor or a generator. The transmission 14 may also be mechanically connected to a drive shaft 20 that is mechanically connected to a set of front wheels 22 or rear wheels. The electric machines 12 may provide propulsion and deceleration capability. A fuel cell stack system 24 may generate electric current to power components of the vehicle 10. For example, a hydrogen and oxygen delivery system may operate with the fuel cell stack system 24 to convert hydrogen gas and oxygen into electric current to power the electric machines 12. The electric current may be referred to as a load. The fuel cell stack system 24 may include one or more fuel cells, such as a polymer electrolyte membrane (PEM) fuel cell, making up a fuel cell stack.

The fuel cell stack system 24 may also include a thermal management system and/or an air flow control system. The thermal management system and/or the air flow control system may include, for example, a compressor. A power control unit 26 may govern a flow of electricity within the vehicle 10. For example, the power control unit 26 may govern the flow of electricity between the fuel cell stack system 24 and the electric machines 12. A hydrogen storage tank 30 may store hydrogen gas for use by the fuel cell stack system 24. A high-output battery 32 may store energy generated from, for example, a regenerative braking system and may provide supplemental power to the electric machines 12.

The various components described above may have one or more associated controllers to control and monitor the operation of the components. The controllers may communicate via a serial bus (e.g., Controller Area Network (CAN)) or via discrete conductors.

Figure 2:
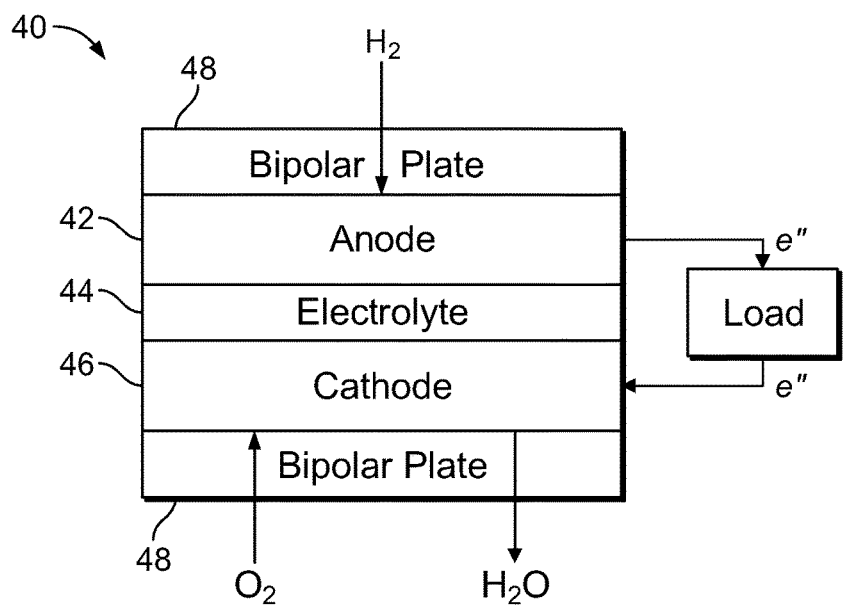
FIG. 2 is a schematic diagram depicting an example of a fuel cell.

FIG. 2 depicts a schematic diagram of an example of a proton exchange membrane (PEM) fuel cell, referred to generally as a PEM fuel cell 40 herein. The PEM fuel cell 40 is one example of a fuel cell which may operate in the fuel cell stack system 24 described above. The PEM fuel cell 40 may include an anode 42, an electrolyte 44, and a cathode 46. Chemical reactions may occur at interfaces between the anode 42, the electrolyte 44, and the cathode 46. For example, the anode 42 may receive a fuel, such as hydrogen, and oxidize the fuel to convert the fuel into one or more positively charged ions and one or more negatively charged electron. The electrolyte 44 may permit the ions to pass through to the cathode 46 while redirecting the electrons around the electrolyte 44 to create a load. The electrons may rejoin the ions within the cathode 46. The cathode 46 may receive a chemical, such as oxygen, to react with the ions and electrons to create, for example, water or carbon dioxide. Bipolar plates 48 may assist in distributing fuel and oxidant within the PEM fuel cell 40, facilitating water management with the PEM fuel cell 40, separating fuel cells within a fuel cell stack, and facilitating thermal management of the PEM fuel cell 40.

Air and water management relating to a system including a fuel cell, such as the PEM fuel cell 40, may affect a performance thereof. For example, electrodes of the fuel cell may be flooded by liquid water with excess hydration above a normal state which may cause fuel starvation, cell potential or current reversal, or corrosion of the electrodes and bipolar plates. In contrast, too little hydration may cause a higher resistance to proton transport in a membrane, e.g. an electrolyte, of the fuel cell and may facilitate radical scavenging of the membrane. Swings in a hydration state of the system may cause mechanical stresses in the membrane that may also lead to premature membrane failures. Control strategies may vary circulation conditions during operation of the system by adjusting temperatures, flow rates, pressures, and electrical current draw to improve the performance and extend a life of the system.

Figure 3:
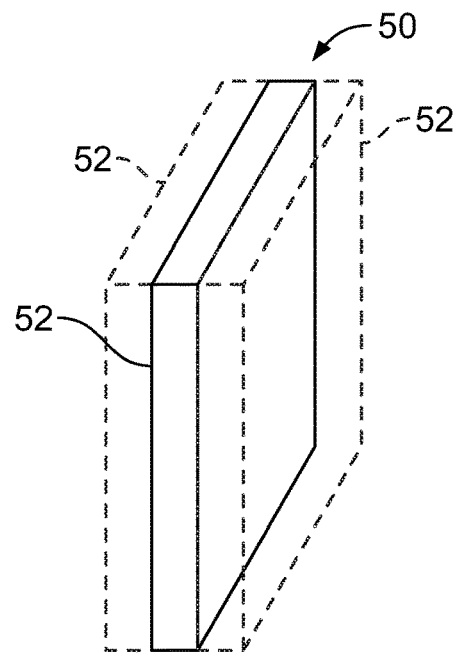
FIG. 3 is a schematic diagram from a perspective view depicting an example of a portion of a fuel cell assembly.

FIG. 3 illustrates a schematic diagram of an example of a fuel cell assembly referred to generally as a fuel cell assembly 50 herein. The fuel cell assembly 50 may include one or more plate assemblies 52. The plate assemblies 52 each include an anode, an electrolyte, and a cathode to operate as a fuel cell. Alternatively, the plate assemblies 52 may collectively include an anode, an electrolyte, and a cathode to operate as a fuel cell.

Each of the one or more plate assemblies 52 includes anode inlets and outlets, cathode inlets and outlets, and channels in fluid communication with the inlets and outlets for reactants to flow therethrough. Each of the one or more plate assemblies 52 includes a flow field for coolant and one or more coolant inlets and outlets. The flow field may include one or more channels. Each of the plate assemblies 52 may arranged for thermal communication between coolant flowing within the flow field and reactants of the fuel cell assembly 50. As shown in FIG. 3, the one or more plate assemblies 52 may be mounted in a stack.

Figure 4:
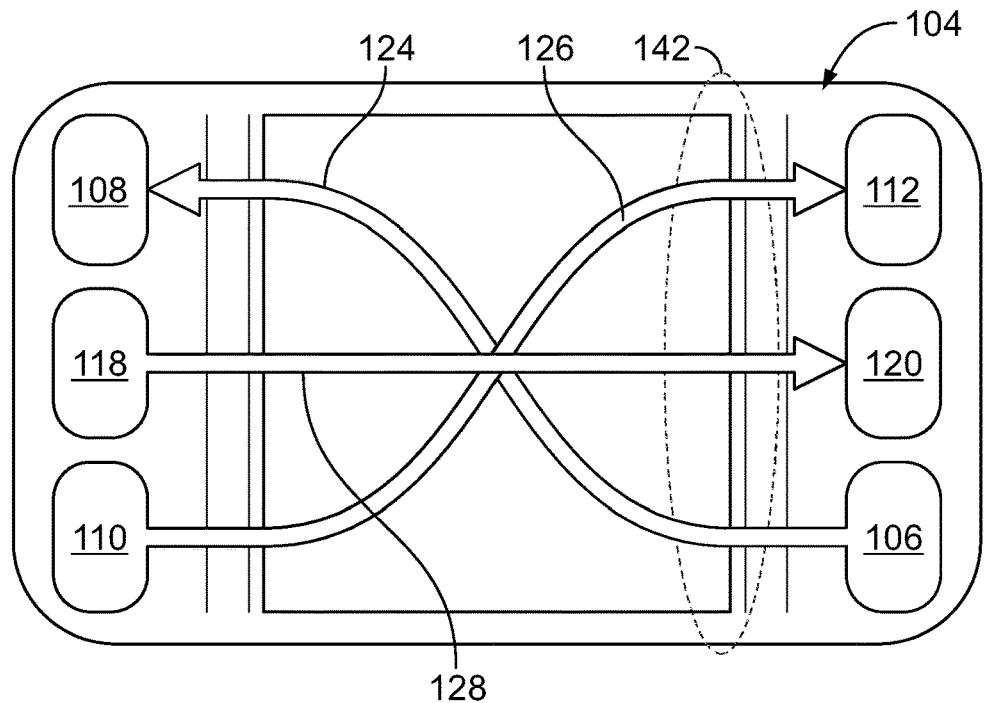
FIG. 4 is a schematic diagram from a plan view depicting an example of a portion of a fuel cell assembly.

FIG. 4 illustrates a schematic diagram from a plan view of a previously known example of a portion of a fuel cell assembly, referred to as a fuel cell assembly 100 herein. Components of the fuel cell assembly 100 operate with one another as a fuel cell. The fuel cell assembly 100 includes a plate assembly 104. The plate assembly 104 includes an anode inlet 106, an anode outlet 108, a cathode inlet 110, a cathode outlet 112, a coolant inlet 118, and a coolant outlet 120. The plate assembly 104 may provide flow paths for anode reactants, cathode reactants, and coolant. An illustrative hydrogen flow path 124 extends from the anode inlet 106 to the anode outlet 108. An illustrative oxygen flow path 126 extends from the cathode inlet 110 to the cathode outlet 112. An illustrative coolant flow path 128 extends from the coolant inlet 118 to the coolant outlet 120. The hydrogen flow path 124 and the oxygen flow path 126 are shown adjacently crossing one another at a central region of the plate assembly 104.

A hot zone 142 represents a portion of the fuel cell assembly 100 in which the reactant and coolant flow paths are at their warmest. The hot zone 142 is located adjacent the cathode outlet 112, the anode inlet 106, and the coolant outlet 120 in this example. The hot zone 142 may influence gas passing through the anode inlet 106 to have dry characteristics below acceptable conditions. These dry characteristics may damage a membrane of the fuel cell assembly 100. Alternative configurations of the coolant inlet 118, the coolant outlet 120, and components of the fuel cell assembly 100 may assist in providing more beneficial thermal conditions for regions near the anode inlet 106 and the cathode inlet 110.

Figure 5:
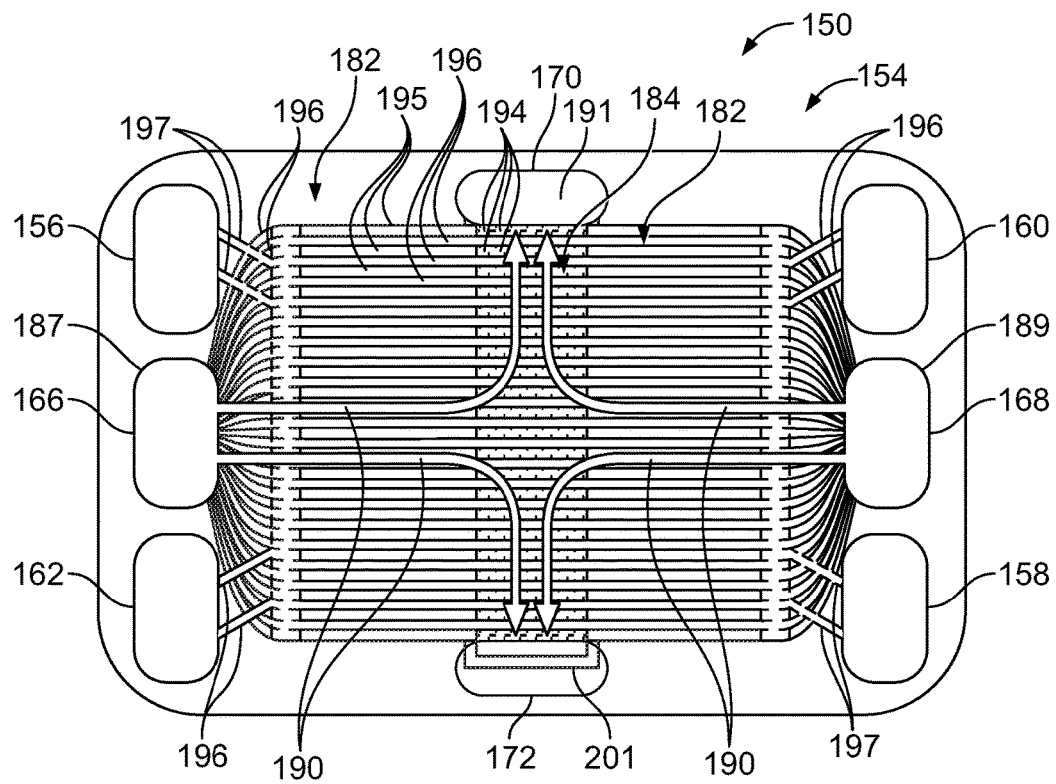
FIG. 5 is a schematic diagram from a plan view depicting an example of a portion of a fuel cell assembly.
Figure 6:
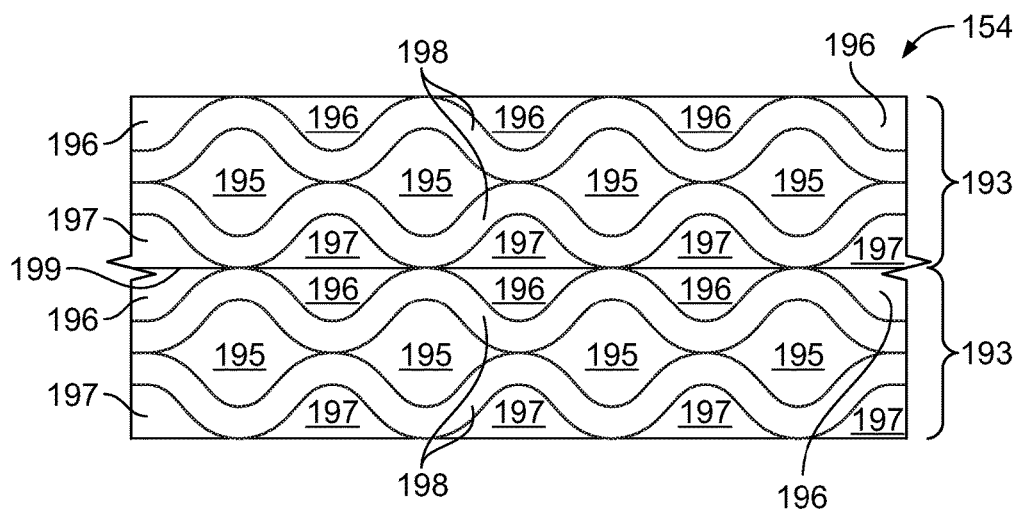
FIG. 6 is a cross-sectional view of a portion of a plate assembly of the fuel cell assembly of FIG. 4.

FIGS. 5 and 6 illustrate an example of a portion of a fuel cell assembly, referred to as a fuel cell assembly 150 herein. FIG. 5 illustrates a schematic diagram from a plan view of the fuel cell assembly 150. The fuel cell assembly 150 may include a fuel cell, a plate assembly 154, an anode inlet 156, an anode outlet 158, a cathode inlet 160, and a cathode outlet 162. The fuel cell includes an anode, an electrolyte, and a cathode. The fuel cell may be a separate unit or may be comprised of components of the plate assembly 154. The plate assembly 154 may include more than one layer and various inlet and outlet configurations to deliver and remove coolant from a coolant flow field and to deliver and remove reactants. One or more first channels (e.g. hydrogen channels 197 shown in FIG. 6) may direct the reactant through one or more manifolds and fluidly connect the anode inlet 156 to the anode outlet. One or more second channels (e.g. oxygen channels 196 shown in FIG. 6) may direct the reactant through another one or more manifolds to fluidly connect the cathode inlet 160 and the cathode outlet 162. The one or more first channels and the one or more second channels may extend adjacent coolant channels (e.g. coolant channels 195 shown in FIG. 6) of the plate assembly 154. The anode inlet and outlet, the cathode inlet and outlet, and the coolant channel inlets and outlets may be arranged with one another to promote thermal conditions of the reactants flowing through the channels while also providing a counter flow of the reactants for chemical reaction purposes. For example, the inlets may be arranged with one another such that coolant influences reactant temperature at the anode inlet 156 and the cathode inlet 160 to maintain a uniform hydration distribution across a fuel cell membrane.

The plate assembly 154 may include a first coolant inlet 166, a second coolant inlet 168, a first coolant outlet 170, and a second coolant outlet 172. The first coolant inlet 166 and the second coolant inlet 168 may be located on opposing sides of the plate assembly 154. Each of the first coolant inlet 166 and the second coolant inlet 168 may be disposed between and/or located adjacent to the anode and cathode inlets and outlets as shown in FIG. 5. For example, the first coolant inlet 166 is shown located adjacent and between the anode inlet 156 and the cathode outlet 162. The second coolant inlet 168 is shown located adjacent and between the cathode inlet 160 and the anode outlet 158. Locating the anode inlet 156 and the cathode inlet 160 adjacent a coolant inlet provides thermal management benefits to reactants passing through the reactant inlets. The coolant operates to cool the reactants at the inlets to eliminate hot zones, such as the hot zone 142, and to eliminate or minimize dry characteristics found in previous inlet and outlet configurations while improving hydration conditions of the fuel cell in comparison to previous fuel cell assembly examples.

A flow of coolant within the plate assembly 154 also influences thermal conditions of the fuel cell assembly 150. Coolant flows from the coolant inlets to the coolant outlets via a pair of manifold regions 180, a pair of first flow field regions 182, and a central flow field region 184 as represented by flow path arrows 190. The central flow field region 184 may be an area of the plate assembly 154 in which coolant flow is obstructed as coolant from opposing inlets meet one another. Various structures are available to assist in minimizing this obstruction.

For example, features such as columns 194 may be located within the central flow field region 184 to cause turbulence within the coolant flow and to promote a more constant coolant flow from the coolant inlets to the coolant outlets. While the columns 194 are shown as substantially square-shaped in this example, it is contemplated that other shapes are available. Channels of the plate assembly 154 may be arranged with one another to facilitate thermal communication between the coolant and the reactants.

Pressure regulators may be mounted at each of the coolant inlets and the coolant outlets to tune a pressure of coolant flow. For example, a first pressure regulator 187 may be mounted at the first coolant inlet 166 for controlling coolant flow pressure. A second pressure regulator 189 may be mounted at the second coolant inlet 168 for controlling coolant flow pressure. A third pressure regulator 191 may be mounted at the first coolant inlet 166 for controlling coolant flow pressure. A fourth pressure regulator 201 may be mounted at the second coolant outlet 172. The pressure regulators may be tuned to promote a constant coolant flow from the coolant inlets to the coolant outlets.

A controller may be in communication with sensors and the pressure regulators to control coolant flow pressure. For example, one or more sensors may monitor thermal and pressure conditions at each of the inlets and outlets. The controller may be programmed to output pressure commands to each of the pressure regulators to adjust coolant flow pressure based on the monitored thermal and pressure conditions. In one example, the controller may direct the pressure regulators to increase coolant flow pressure in response to receipt of signals from the sensors indicating a temperature of reactant at one of the anode inlet 156 or the cathode inlet 160 is above a predetermined threshold. The predetermined threshold may be a temperature threshold representing optimal reactant conditions for operation of the fuel cell. In one example, an optimal temperature range may be between sixty degrees Celsius and seventy degrees Celsius. An optimal hydration condition for the membrane may be a Lambda value of between seven and ten moles of water per moles of acid.

FIG. 6 is a cross-sectional view of a portion of the plate assembly 154 illustrating further detail of a multi-plate embodiment of the plate assembly 154. In this example, the plate assembly 154 has two plates 193. Each of the plates 193 may be made of a carbon or metal material such as graphite, coated stainless steel, or titanium. Channels for reactants and coolant are located adjacent one another within each of the plates 193 for thermal communication therebetween. For example, coolant channels 195 are shown located adjacent oxygen channels 196 and hydrogen channels 197. Coolant flowing through the coolant channels 195 draws heat from the oxygen and hydrogen flowing through the oxygen channels 196 and the hydrogen channels 197, respectively. Walls 198 may separate the various channels from one another. When the plates 193 are stacked, the oxygen channels 196 and the hydrogen channels 197 may be arranged on opposite sides of a membrane 199 to facilitate operation as a fuel cell.

FIGS. 7 and 8 illustrate another example of a portion of a fuel cell assembly, referred to as a fuel cell assembly 200 herein. FIG. 7 illustrates a schematic plan view of a portion of the fuel cell assembly 200. The fuel cell assembly 200 may include a fuel cell and a plate assembly 206. The plate assembly 206 may include an anode inlet 208, an anode outlet 210, a cathode inlet 212, and a cathode outlet 214. The plate assembly 206 includes an anode, an electrolyte, and a cathode. Similar to the plate assembly 154, the plate assembly 206 may include two plates having coolant channels and reactant channels. The plate assembly 206 may include more than one layer and various inlet and outlet configurations to deliver and remove coolant from a coolant flow field. A set of first channels 211 fluidly connects the anode inlet 208 to the anode outlet 210 for a reactant to flow therethrough and a set of second channels 213 connects the cathode inlet 212 and the cathode outlet 214 for another reactant to flow therethrough. The anode inlet and outlet, the cathode inlet and outlet, and the coolant channel inlets and outlets may be arranged with one another to promote thermal conditions of the reactants while also providing a counter flow of the reactants for chemical reaction purposes.

For example, the plate assembly 206 may include a first coolant inlet 218, a second coolant inlet 220, a third coolant inlet 224, and a coolant outlet 226. The first coolant inlet 218 and the third coolant inlet 224 may be located on opposing sides of the plate assembly 206. Each of the first coolant inlet 218 and the third coolant inlet 224 may be disposed between and/or adjacent the anode and cathode inlets and outlets as shown in FIG. 7. For example, the first coolant inlet 218 is shown located adjacent and between the anode inlet 208 and the cathode outlet 214. The third coolant inlet 224 is shown located adjacent and between the cathode inlet 212 and the anode outlet 210. Locating the anode inlet 208 and the cathode inlet 212 adjacent a coolant inlet provides thermal management benefits to reactants passing through the inlets. The coolant (being coolest at the coolant inlets) operates to cool the reactants at the inlets to eliminate hot zones, such as the hot zone 142, and to eliminate or minimize dry characteristics found in previous inlet and outlet configurations while improving hydration conditions. The second coolant inlet 220 and the coolant outlet 226 are located on opposing sides of the plate assembly 206.

As mentioned above, a flow of coolant within the plate assembly 206 also influences thermal conditions of the fuel cell assembly 200. Coolant flows from the coolant inlets to the coolant outlet 226 via a pair of manifold regions 230, a pair of first flow field regions 232, and a central flow field region 234 as represented by flow path arrows 238. Channels of the plate assembly 206 may be arranged with one another to facilitate thermal communication between the coolant and the reactants which is further assisted by uniform coolant flow. The central flow field region 234 may be an area of the plate assembly 206 in which coolant flow is obstructed as coolant from the inlets meet one another. Various structures are available to assist in minimizing this obstruction.

For example, features, such as columns 240, may be located within the central flow field region 234 to cause turbulence within the coolant flow and to promote a more constant coolant flow from the coolant inlets to the coolant outlet. While the columns 240 are shown as substantially square-shaped in this example, it is contemplated that other shapes are available.

Various pressurization applications may also assist in managing coolant flow within the plate assembly 206. For example, pressure regulators 242 may be located at each of the coolant channel inlets and the coolant outlet 226 to assist in managing the coolant flow at a desired and predetermined flow rate. The coolant flow rate may be tuned to be substantially equal to a flow rate of the hydrogen and the oxygen, such as a flow rate between one atmosphere and 3.5 atmospheres. In one example, coolant flow at the first coolant inlet 218 and the third coolant inlet 224 may be regulated to have a high pressure, such as a flow rate of 3 atmospheres. Coolant flow at the second coolant inlet 220 may be regulated to have a medium pressure less than the high pressure, such as 1.3 atmospheres. Coolant flow at the coolant outlet 226 may be regulated to have a low pressure less than the medium pressure, such as 1.2 atmospheres.

A controller may be in communication with sensors and the pressure regulators 242 to control coolant flow pressure. For example, one or more sensors may monitor thermal and pressure conditions at each of the inlets and outlets. The controller may be programmed to output pressure commands to each of the pressure regulators 242 to adjust coolant flow pressure based on the monitored thermal and pressure conditions. In one example, the controller may direct the pressure regulators 242 to increase coolant flow pressure in response to receipt of signals from the sensors indicating a temperature of reactant at one of the anode inlet 208 or the cathode inlet 212 is above a predetermined threshold. The predetermined threshold may be a temperature threshold associated with optimal reactant conditions.

Optionally, a structure of the coolant channels may assist in managing pressurization of coolant flow within the plate assembly 206. FIG. 8 illustrates an example of a series of coolant channels having bottleneck portions with varied widths to selectively influence coolant flow across the flow fields by restricting coolant flow at the bottleneck portions. A first coolant channel 249 defines a portion having a first width 250, a second coolant channel 251 defines a portion having a second width 252, and a third coolant channel 253 defines a portion having a third width 254. The second width 252 defines a width greater than the first width 250 and less than the third width 254. The coolant channels may be arranged with one another such that the widths increase in subsequent coolant channels from outer portions of each of the pair of first flow field regions 232 to an inner portion of each of the pair of first flow field regions 232. The arrangement of the bottleneck portions may create a constant flow to the coolant outlet 226 by influencing a flow rate of coolant meeting at the central flow field region 234.

Figure 9:
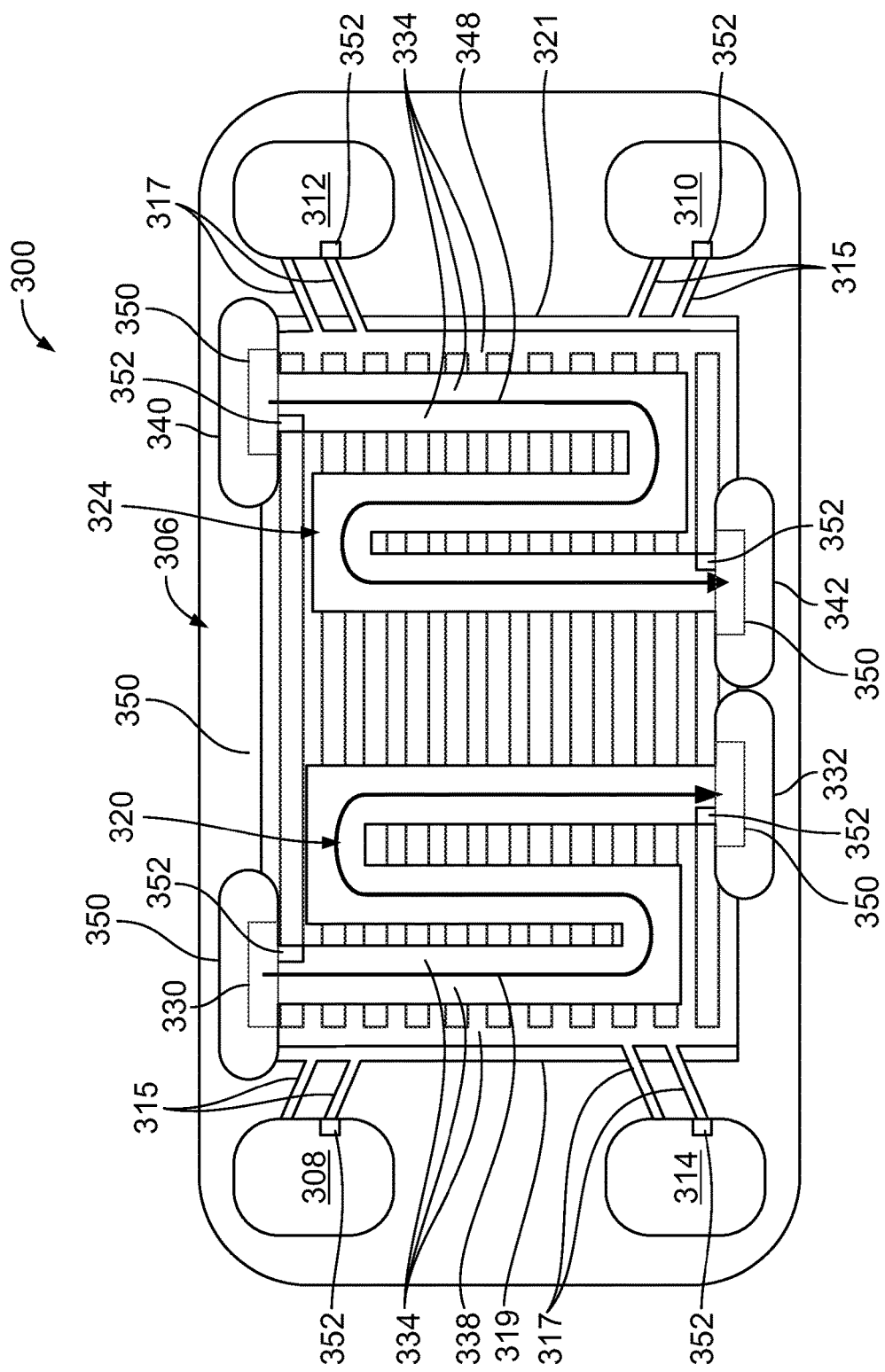
FIG. 9 is a schematic diagram from a plan view depicting an example of a portion of a fuel cell assembly.

FIG. 9 illustrates yet another example of a portion of a fuel cell assembly, referred to as a fuel cell assembly 300. The fuel cell assembly 300 may include a fuel cell and a plate assembly 306. The plate assembly 306 may include an anode inlet 308, an anode outlet 310, a cathode inlet 312, and a cathode outlet 314. The fuel cell assembly 300 includes an anode, an electrolyte, and a cathode. The plate assembly 306 may include more than one layer and various inlet and outlet configurations to deliver and remove coolant from a coolant flow field. An anode channel 315 connects the anode inlet 308 to the anode outlet 310 for a hydrogen to flow therethrough and a cathode channel 317 connects the cathode inlet 312 and the cathode outlet 314 for oxygen to flow therethrough. The anode channels 315 may deliver the hydrogen to a first manifold 319. The first manifold 319 may assist in delivering the hydrogen to hydrogen channels (not visible in FIG. 9) disposed below the anode channels 315 and then a second manifold 321 enroute to the anode outlet 310.

The anode inlet 308, the anode outlet 310, the cathode inlet 312, the cathode outlet 314, coolant channel inlets, and coolant channel outlets may be arranged with one another to promote thermal conditions of the hydrogen and oxygen reactants while also providing a counter flow of the reactants for chemical reaction purposes.

The plate assembly 306 may include more than one plate and various inlet and outlet configurations to deliver and remove coolant from a coolant flow field. For example, the plate assembly 306 may include one or more coolant channel configurations such as first coolant channel configuration 320 and a second coolant channel configuration 324. Each of the coolant channel configurations may be arranged upon the plate assembly 306 so that coolant flows in a direction substantially perpendicular to a directional flow of the reactants.

For example, the first coolant channel configuration 320 may include a first coolant inlet 330 and a first coolant outlet 332. A coolant channel 334 extends between the first coolant inlet 330 and the first coolant outlet 332 in a serpentine fashion for coolant flow (represented by flow arrow 338). The second coolant channel configuration 324 may include a second coolant inlet 340 and a second coolant outlet 342. A coolant channel 344 extends between the second coolant inlet 340 and the second coolant outlet 342 in a serpentine fashion for coolant flow (represented by flow arrow 348). In one example, the first coolant outlet 332 and the second coolant outlet 342 may be a single outlet to simplify coolant plumbing of the plate assembly 306. It is contemplated that one of the hydrogen channels and the oxygen channels may extend above the first coolant channel configuration and the second coolant channel configuration 324 (similar to an orientation of coolant channels and reactant channels shown in FIG. 6).

Various pressurization applications may also assist in managing coolant flow within the plate assembly 306. For example, pressure regulators 350 may be located at each of the coolant channel inlets and the coolant channel outlets to assist in managing the coolant flow at a predetermined flow rate. In one example, coolant flow at the first coolant inlet 330 and the second coolant inlet 340 may be regulated to have a first pressure. Coolant flow at the first coolant outlet 332 and the second coolant outlet 342 may be regulated to have a second pressure lower than the first pressure. The first pressure and the second pressure may be predetermined based on a desired coolant flow rate through the coolant channels.

A controller may be in communication with sensors and the pressure regulators 350 to control coolant flow pressure. For example, one or more sensors 352 may monitor thermal and pressure conditions at each of the inlets and outlets. The controller may be programmed to output pressure commands to each of the pressure regulators 350 to adjust coolant flow pressure based on the monitored thermal and pressure conditions. In one example, the controller may direct the pressure regulators 350 to increase coolant flow pressure in response to receipt of signals from the one or more sensors 352 indicating a temperature of reactant at one of the anode inlet 308 or the cathode inlet 312 is above a predetermined threshold.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:
1. A fuel cell assembly comprising:
    a plate assembly including an anode inlet, a cathode inlet, a first coolant inlet located adjacent the anode inlet on a first plate side, and a second coolant inlet located adjacent the cathode inlet on a second plate side,
    wherein the inlets are arranged such that coolant influences reactant temperature at the anode and cathode inlets to encourage formation of a membrane uniform hydration distribution during fuel cell operation.

2. The assembly of claim 1 further comprising:
a hydrogen channel extending between the anode inlet and an anode outlet disposed on the second plate side;
an oxygen channel extending between the cathode inlet and a cathode outlet disposed on the first plate side; and
a coolant channel extending between the first coolant inlet and a coolant outlet,
wherein the coolant channel extends between the hydrogen channel and the oxygen channel to draw heat from hydrogen and oxygen flowing therethrough and such that the hydrogen and oxygen are close enough to one another for chemical reaction therebetween.

3. The assembly of claim 1 further comprising a first coolant outlet disposed on a third plate side, a second coolant outlet disposed on a fourth plate side, and a coolant flow field fluidly connecting the coolant inlets and outlets, wherein the coolant inlets and the coolant outlets are arranged with one another such that a flow rate of coolant from the coolant inlets to the coolant outlets is uniformly distributed across the coolant flow field.

4. The assembly of claim 1 further comprising a first coolant outlet disposed on a third plate side, a second coolant outlet disposed on a fourth plate side, and a coolant flow field fluidly connecting the coolant inlets and outlets, wherein the coolant flow field includes a central region having one or more columns to influence coolant flow turbulence to promote a uniform coolant flow rate from the coolant inlets to the coolant outlets.

5. The assembly of claim 1, wherein the plate assembly further includes two plates, each plate including a pair of serpentine walls arranged with one another to form two separate coolant channels between the serpentine walls, a hydrogen channel extending substantially perpendicular to a portion of one of the coolant channels and between the anode inlet and an anode outlet, and an oxygen channel extending substantially perpendicular to a portion of one of the coolant channels and between the cathode inlet and a cathode outlet, and wherein the channels are arranged with one another such that the hydrogen channel and the oxygen channel are adjacent one another to promote chemical reactions therebetween and such that coolant flowing through the coolant channel is in thermal communication with hydrogen and oxygen flowing through the hydrogen channel and the oxygen channel.

6. The assembly of claim 1 further comprising:
a first pressure regulator for controlling a first coolant flow pressure at the first coolant inlet;
a second pressure regulator for controlling a second coolant flow pressure at the second coolant inlet; and
a third pressure regulator for controlling a third coolant flow pressure at a first coolant outlet,
wherein the pressure regulators are tuned to promote a constant coolant flow from the coolant inlets to the coolant outlets.

7. The assembly of claim 1, wherein the arrangement of the inlets influences reactant temperature at the anode inlet and the cathode inlet to be between sixty degrees Celsius and seventy degrees Celsius.

8. A fuel cell plate assembly comprising:
a hydrogen channel extending from an anode inlet to an anode outlet;
an oxygen channel extending from a cathode inlet to a cathode outlet; and
first and second coolant channel configurations each including a coolant inlet and a coolant outlet,
wherein the anode inlet and the cathode outlet are located on a first plate side, the cathode inlet and the anode outlet are located on a second plate side, each of the coolant inlets are located on a third plate side, and each of the coolant outlets are located on a fourth plate side such that coolant within the first and second coolant channel configurations flows in a direction substantially perpendicular to a portion of hydrogen flowing within the hydrogen channel and oxygen flow within the oxygen channel.

9. The assembly of claim 8, wherein each of the coolant inlets is located adjacent one of the anode inlet and the cathode inlet such that a reactant passing through the anode inlet or the cathode inlet is in thermal communication with coolant entering one of the coolant inlets.

10. The assembly of claim 8 further comprising three pressure regulators each positioned at one of the coolant inlets and the coolant outlet, wherein the pressure regulators are tuned to promote a substantially constant coolant flow between the coolant inlets and the coolant outlet.

11. The assembly of claim 8, wherein the first and second coolant channel configurations each define a serpentine shape between respective coolant inlets and coolant outlets.

12. The assembly of claim 8 further comprising:
a pressure regulator at each of the coolant inlets and the coolant outlets;
a sensor at each of the anode inlet and the cathode inlet to monitor thermal conditions of an entering reactant; and
a controller in communication with the pressure regulators and the sensor and programmed to adjust a coolant pressure based on the monitored thermal conditions of the anode inlet or the cathode inlet.

13. The assembly of claim 12, wherein the controller directs the pressure regulators to operate to maintain constant coolant flow rate throughout the first and second coolant channel configurations.

14. The assembly of claim 8, wherein the arrangement of the inlets influences reactant temperature at the anode inlet and the cathode inlet to be between sixty degrees Celsius and seventy degrees Celsius.

15. A fuel cell assembly comprising:
a plate assembly including a first coolant inlet located between an anode inlet and a cathode outlet, a second coolant inlet located between a cathode inlet and an anode outlet, and a third coolant inlet located on a plate assembly first side opposite a coolant outlet located on a plate assembly second side; and
three pressure regulators each for controlling a coolant flow pressure through one of the first coolant inlet, the second coolant inlet, and the third coolant inlet,
wherein the pressure regulators are arranged with one another to tune the coolant flow pressure such that the coolant flow pressure at the coolant outlet is less than the coolant flow pressure at the third coolant inlet which is less than the coolant flow pressure at the first and second coolant inlets.

16. The assembly of claim 15, wherein the three pressure regulators are tuned to promote a substantially constant coolant flow at a central region of the plate assembly.

17. The assembly of claim 15, wherein the three pressure regulators are tuned to promote a flow pressure at the first and second coolant inlets of approximately 3.0 atmospheres, and a flow pressure at the third coolant inlet of approximately 1.3 atmospheres.

18. The assembly of claim 15 further comprising a fourth pressure regulator for maintaining a coolant flow pressure through the coolant outlet at a pressure lower than a pressure of the coolant inlets.

19. The assembly of claim 15 further comprising:
a sensor located at each coolant inlet and outlet for measuring a pressure of coolant flow; and
a controller in communication with the sensors and the three pressure regulators and programmed to adjust pressure control of the three pressure regulators such that a coolant pressure flow at the coolant outlet is between 1.2 and 3.1 atmospheres.

20. The assembly of claim 15 further comprising:
hydrogen channels extending between the anode inlet and the anode outlet;
oxygen channels extending between the cathode inlet and the cathode outlet; and
coolant channels extending between the coolant inlets and the coolant outlet,
wherein the channels are arranged with one another such that the hydrogen channels and the oxygen channels are disposed between the coolant channels for thermal communication between reactants and coolant flowing through respective channels.

* * * * *